Figure 1:
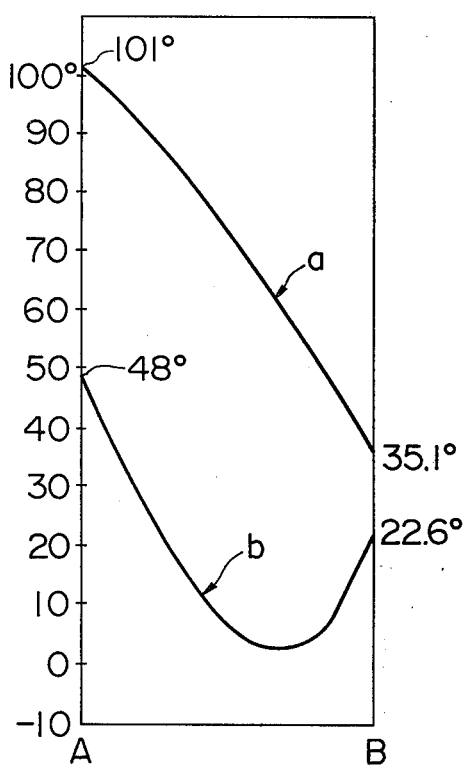

United States Patent [19]

Sato et al.

[11] 4,206,071

[45] Jun. 3, 1980

[54] LIQUID CRYSTAL COMPOSITION

[75] Inventors: Hideo Sato; Takashi Inukai; Shigeru Sugimori, all of Yokohamashi, Japan

[73] Assignee: Chisso Corporation, Osaka, Japan

[21] Appl. No.: 580,399

[22] Filed: May 22, 1975

[30] Foreign Application Priority Data

May 25, 1974 [JP] Japan .................................. 49-58992

[51] Int. Cl.$^2$ ........................... C09K 3/34; G02F 1/13
[52] U.S. Cl. .................... 252/299; 252/408; 350/350 R
[58] Field of Search ................. 252/299, 408 LC; 350/160 LC, 350

[56] References Cited

U.S. PATENT DOCUMENTS

| | | | |
|---|---|---|---|
| 3,815,972 | 6/1974 | Hsieh | 252/299 |
| 3,891,307 | 6/1975 | Tsukamoto et al. | 350/160 LC |
| 3,947,375 | 3/1976 | Gray et al. | 252/299 |
| 3,952,046 | 4/1976 | Scherrer et al. | 252/299 |
| 3,954,653 | 5/1976 | Yamazaki | 252/299 |
| 4,020,002 | 4/1977 | Oh | 252/299 |
| 4,137,192 | 1/1979 | Matsufuji | 252/299 |
| 4,138,358 | 2/1979 | Labes | 252/299 |

FOREIGN PATENT DOCUMENTS

| | | | |
|---|---|---|---|
| 814291 | 8/1974 | Belgium | 252/299 |
| 2306738 | 8/1973 | Fed. Rep. of Germany | 252/299 |
| 2502904 | 7/1975 | Fed. Rep. of Germany | 252/299 |

OTHER PUBLICATIONS

Gray, G. W. et al., Electronics Letters, vol. 9, No. 6, pp. 130–131 (Mar. 1973).

*Primary Examiner*—Teddy S. Gron
*Attorney, Agent, or Firm*—Fred Philpitt

[57] ABSTRACT

Novel liquid crystal compositions being in a nematic state over a wide temperature range including room temperature and having superior electrooptical properties are prepared by mixing a mixture of specified p-alkoxybenzylidene-p'-cyanoanilines, as one component, with one kind alone or a mixture of specified p-alkyl-p'-cyanobiphenyls, as a second component, or by further adding to the resulting mixture, p-methoxy-or ethoxy-or methyl-benzylidene-p'-n-butylaniline or a mixture thereof, as a third component.

1 Claim, 2 Drawing Figures

LIQUID CRYSTAL COMPOSITION

DESCRIPTION OF THE INVENTION

The present invention relates to a liquid crystal composition. More particularly it relates to a liquid crystal composition to be used for the electro-optical light valve which is actuated due to the electric field effect when a voltage is impressed on a liquid crystal cell having a twisted orientation of liquid crystal.

For the electric field effect type liquid crystal displays, a nematic liquid crystal having a positive, dielectric anisotropy (which will be hereinafter abbreviated as Np substance) has been generally employed, but Np substance has its nematic liquid crystal temperature range in a relatively high temperature region, and those which form, by themselves a nematic liquid crystal state over a practically sufficient temperature range, have not yet been known. Thus, liquid crystals used for liquid crystal display apparatus are mixed ones, and hence what kind of composition is selected is very important for the liquid crystal display. The present invention aims at solving this problem.

Namely, the compounds employed as one component in the present invention and expressed by the general formula

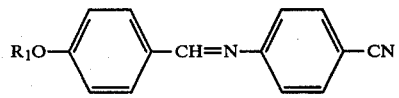

(a)

(which will be hereinafter abbreviated as compounds of the general formula (a), and their mixtures, have heretofore been known as Np substance. However, since they all crystallize at room temperature, a heat source for maintaining the temperature of liquid crystal is necessary. For shifting the nematic temperature range toward the lower temperature side, there is a method of adding a Nn substance (nematic liquid crystal having a negative, dielectric anisotropy) such as p-methoxybenzylidene-p'-n-butylaniline, p-ethoxybenzylidene-p'-n-butylaniline, p-methylbenzylidene-p'-n-butylaniline. However, in order to extend a nematic temperature range to a practically desirable extent, Nn substance must be added in a larger amount than that of the compounds of the general formula (a). As a result, the inherent, characteristic physical properties of the compounds of the general formula (a) are remarkably harmed. For example, a mixed liquid crystal of p-methoxybenzylidene-p'-n-butylaniline (3 mols), p-ethoxybenzylidene-p'-n-butylaniline (2 mols) and p-hexyloxybenzylidene-p'-cyanoaniline (one mol) (a compound of $R_1=n\text{---}C_6H_{13}$—in the general formula (a), has, at 10° C., a response threshold voltage (i.e. a voltage necessary for causing 10% response) of about 2.5 V and a response saturation voltage (i.e. a voltage necessary for causing 90% response) of about 6 V, while, at −5° C., the response threshold voltage and the response saturation voltage change to about 3.8 V and about 14 V, respectively. In the practical display apparatus, since it is necessary to impress at least a driving voltage close to the response saturation voltage, it is very disadvantageous for a driving circuit that the actuating voltage varies notably as above.

In the preparation of mixed liquid crystal, there occurs further an obstacle, besides the above-mentioned drawback in respect of the electrical characteristics. Namely, if the combination of individual compounds for liquid crystal, to be mixed together is not suitable, mixing of compounds which alone do not exhibit any smectic state, often results in forming a smectic mixed liquid crystal, due to a mutual action between the compounds which is difficult to anticipate on the present technical level. As seen from the objects of the present invention mentioned below, it is aimed in the present invention to prevent such forming of a smectic mixed liquid crystal, over a wide temperature range including room temperature.

An object of the present invention is to provide a liquid crystal composition which is in a nematic state over a wide temperature range including room temperature; gives a necessary driving voltage which is lower and also hardly varies depending upon temperature change, i.e. is almost constant; and gives a sufficiently high response speed even at lower temperatures.

Another object of the present invention is to provide an electric field type liquid crystal composition having properties of (i) being in a state of a nematic liquid crystal having a positive, dielectric anisotropy, (ii) actuating at lower voltage, and (iii) a higher response speed, over a wide temperature range including temperatures of natural or artificial environment where an apparatus in which a light valve element to be used for the above-mentioned light valve is set is usually placed.

After strenuous studies, the present inventors have attained the present invention.

The present invention resides first in a liquid crystal composition obtained by mixing a mixture of two or more kinds of p-alkoxybenzylidene-p'-cyanoanilines expressed by the general formula

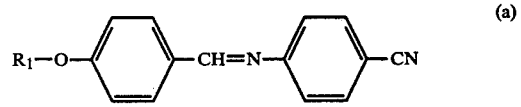

(a)

(wherein $R_1$ is n-butyl, n-pentyl, n-hexyl or n-octyl group),
with one kind alone or two or more kinds in admixture, of p-alkyl-p'-cyanobiphenyls expressed by the general formula

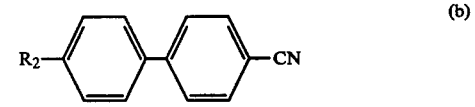

(b)

(wherein $R_2$ is n-pentyl, n-hexyl or n-heptyl group), in a ratio by mol fraction of the mixture of the compounds expressed by the general formula (a) to one kind or the mixture of the compounds expressed by the general formula (b), of 1:0.66–1:9.

The present invention further includes as a modification, a liquid crystal composition obtained by adding to the above-mentioned liquid crystal composition of the first invention, p-methoxybenzylidene-p'-n-butylaniline, p-ethoxybenzylidene-p'-n-butylaniline, p-methylbenzylidene-p'-n-butylaniline or a mixture of the foregoing, in an amount of 15 mol% or less based on the liquid crystal composition of the first invention.

Figure 2:
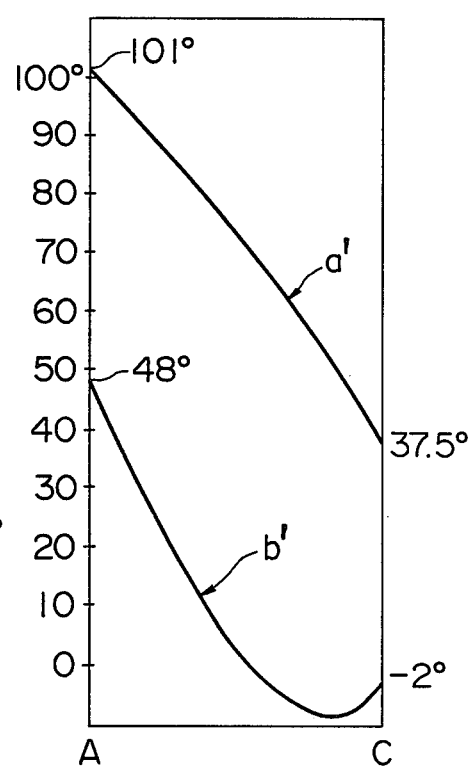

FIGS. 1 and 2 depict phase diagrams of mixed liquid crystals according to the present invention.

As for the one group as a component, of the liquid crystal of the present invention, one or more kinds, preferably two or more kinds are selected from among the above-mentioned p-alkoxybenzylidene-p'-cyanoanilines expressed by the general formula (a), and for example, in the case of two kinds, these are mixed preferably in a mol ratio of 1:1. Although a mixture of three or more kinds can be employed, a mixture of two kinds is sufficient in many cases. Among the compounds expressed by the general formula (a), particularly a mixture of a compound of $R_1$=n-butyl in (a) with that of $R_1$=n-hexyl exhibits particularly superior characteristics at lower temperatures.

However, in the case of the single use of one kind or two or more kinds in admixture, of the compounds expressed by the general formula (a), liquid crystal composition having characteristics aimed in the present invention cannot be brought about.

Thus, after various studies, compounds expressed by the above-mentioned general formula (b), as a second group to be combined with the compounds expressed by the general formula (a), have been found, and the present invention has been attained.

The second group as another component of the liquid crystal composition of the present invention is one kind alone or two or more kinds in admixture, of p-n-alkyl-p'-cyanobiphenyls expressed by the above-mentioned general formula (b). However, in order to attain the objects of the present invention, there is a suitable range of mixing ratio (by mol fraction) of the mixture of the compounds of the general formula (a) to one kind or the mixture of the compounds of the general formula (b).

By mixing the component selected from the above-mentioned first group with that selected from the second group in a ratio by mol fraction, of the former to the latter, of 1:0.66–1:9, a mixed liquid crystal having a nematic temperature range required for usual display apparatuses can be obtained. If the mol fraction of the component of the first group is higher, a nematic temperature range extended over a relatively high temperature region is obtained, while if the mol fraction of the component of the second group is higher, a nematic temperature range extended over a relatively low temperature region is obtained. Thus, the mixing ratio can be selected in accordance with the object for which the display apparatuses are employed.

After further extensive studies for improving the above-mentioned invention, the present inventors have attained a modification thereof.

Namely, by further adding to the liquid crystal composition, a component of a third group, i.e. p-methoxybenzylidene-p'-n-butylaniline, p-ethoxybenzylidene-p'-n-butylaniline, p-methylbenzylidene-p'-n-butylaniline or a mixture of the foregoing, in a suitable amount, a liquid crystal composition in which the nematic temperature range is further extended, can be prepared. However, addition of the component of the third group in a large amount is unsuitable. Namely, if the component is added in such a large amount that it constitutes a main component of the composition of the present invention (e.g. 50 mol% or more), the necessary driving voltage is elevated and also the temperature-dependence is increased. Further if the component of the third group is added not in such a large amount that it constitutes a main component of the composition, but in a considerable amount (e.g. 20 mol% or more), the nematic structure is broken and a smectic state is formed at room temperature. On the other hand, if the component of the third group is added to the mixture of the components of the first group and the second group, in an amount of about 15 mol%–1 mol%, preferably about 15 mol%–3 mol%, the nematic structure is maintained down to temperatures in the vicinity of 0° C., and also in this case, since the amount of the component of the third group added is small, there appears no bad influence on the actuating voltage characteristics. One of the characteristics effectivenesses of the liquid crystal composition of the modification as it is applied for practical use, is a fact that when it is excessively cooled, its structure changes to a smectic one, whereby its fluidity is remarkably reduced and hence it hardly crystallizes.

Due to the above-mentioned effectiveness, the display apparatus (liquid crystal cell) in which the liquid crystal composition of the modification is applied, even after its temperature is lowered to below the nematic liquid crystal temperature region, exhibits a very rapid recovery of the characteristics in the nematic liquid crystal temperature region.

A common effectiveness in the first stated invention and a modification thereof is as follows:

By employing as liquid crystal-constituting compounds, p-alkoxybenzylidene-p'-cyanoanilines expressed by the general formula (a), p-alkyl-p'-cyanobiphenyls expressed by the general formula (b), and further p-methoxybenzylidene-p'-n-butylaniline, p-ethoxybenzylidene-p'-n-butylaniline, p-methyl-benzylidene-p'-n-butylaniline or a mixture of the foregoing, which are used for the modification, each having a relatively narrow temperature range at room temperature or higher, in a manner according to the first stated invention and the modification thereof, it has become possible to make the mixture of these compounds function as a liquid crystal composition down to an unexpectable low temperature region. Namely, as apparent from FIG. 1 referred to in Example 1 mentioned below, the temperature range of the composition of the first stated invention as a liquid crystal composition is over a wide range of 10° C. (or lower) to 40° C. (or 70° C. or higher if the range is selected). As well, the temperature range of the composition of the modification as a liquid crystal composition is over a further wide range (see Examples 3 and 4).

As described above, the liquid crystal compositions of the present invention have superior performances. The constitution and the effectivenesses of the present invention will be further illustrated concretely by the following Examples.

EXAMPLE 1

A mixture of p-n-butoxybenzylidene-p'-cyanoaniline with p-n-hexyloxybenzylidene-p'-cyanoaniline in a mol ratio of 1:1 is abbreviated as A, while p-n-pentyl-p'-cyanobiphenyl is abbreviated as B. FIG. 1 of the accompanying drawing shows the phase diagram of a mixed liquid crystal consisting of A and B. In FIG. 1, line a shows the transition temperatures of a nematic liquid and an isotropic liquid, while line b shows the temperatures at which the solid phase disappears by heating. The area enclosed by lines a and b is substantially in a liquid crystal state. For example, a mixed liquid crystal of A:B=24:76 has a nematic temperature range of 4° C.–53° C. Also this composition has a response threshold voltage of 0.8 V and a response saturation voltage of 1.2 V at 25° C., and a response threshold voltage of 1.0 V and a response saturation voltage of 1.6 V at 4° C. Further its rise response time ($\tau$ rise) and decay response time (τ decay) are 50 ms and 220 ms at 25° C. (11 micron cell used; 3 V rms impression), respectively.

As apparent from the above-mentioned, the liquid crystal composition of this Example exhibits superior performances when it is used for electro-optical light valve to be actuated by the electric field effect by impressing a voltage upon a liquid crystal cell having a twisted orientation.

EXAMPLE 2

A mixture of p-n-butoxybenzylidene-p'-cyanoaniline with p-n-hexyloxybenzylidene-p'-cyanoaniline in a mol ratio of 1:1 is abbreviated as A, and a mixture of p-n-pentyl-p'-cyanobiphenyl with p-n-heptyl-p'-cyanobiphenyl in a mol ratio of the former to the latter, of 59-41 is abbreviated as C. FIG. 2 shows the phase diagram of a mixed liquid crystal consisting of A and C.

In FIG. 2, line a' shows the transition temperatures of a nematic liquid and an isotropic liquid, while line b' shows the temperatures at which the solid phase disappears by heating. The area enclosed by lines a' and b' is substantially in a liquid crystal state. For example, a mixed liquid crystal of A:C=40:60 has a nematic temperature range of −3° C.-66° C. Also this composition has a response threshold voltage of 0.9 V and a response saturation voltage of 1.5 V at 13° C., and a response threshold voltage of 1.1 V and a response saturation voltage of 1.7 V at 4° C. Further its rise response time (τ rise) and decay response time (τ decay) are 90 ms and 460 ms at 13° C. (10 micron cell used; 3 V rms impression), respectively.

The actuation characteristic of the liquid crystal compositions shown in the above Examples 1 and 2 is characterized in a fact that the temperature-dependence of the necessary driving voltage is very small. It is seen that this temperature-dependence presents a marked contrast with the large temperature-dependence of the mixed liquid crystal obtained by diluting the compounds of the general formula (a) with a Nn substance as shown above.

EXAMPLE 3

To a mixed liquid crystal consisting of 16.83 mol% of p-n-butoxybenzylidene-p'-cyanoaniline, 16.83 mol% of p-n-hexyloxybenzylidene-p'-cyanoaniline and 66.34 mol% of p-n-pentyl-p'-cyanobiphenyl and having a nematic temperature range of 3° C.-60.5° C., is added p-ethoxybenzylidene-p'-n-butylaniline in an amount of 10.5 mol% based upon the mols in total, of the foregoing three compounds (the mol ratio of the resulting composition being 15.24:15.24:60.00:9.52). The resulting nematic liquid crystal composition changes to a smectic liquid crystal at −15° C., and even when allowed to stand at −15° C. for a long time, it does not crystallize. By heating, it becomes an isotropic liquid at 62° C. It has a response threshold voltage of 1.2 V and a response saturation voltage of 2.0 V at 25° C., while a response threshold voltage of 1.8 V and a response saturation voltage of 2.5 V at −5° C. Its rise response time (τ rise) and decay response time (τ decay) are 110 ms and 110 ms at 25° C. (11 micron cell used; 3 V rms impression), respectively.

EXAMPLE 4

To a mixed liquid crystal consisting of 25 mol% of p-n-butoxybenzylidene-p'-cyanoaniline, 25 mol% of p-n-hexyloxybenzylidene-p'-cyanoaniline, 29.5 mol% of p-n-pentyl-p'-cyanobiphenyl and 20.5 mol% of p-n-heptyl-p'-cyanobiphenyl, and having a nematic temperature range of 3° C.-72.5° C., are added 8 mol% of p-methoxybenzylidene-p'-n-butylaniline and 4 mol% of p-ethoxybenzylidene-p'-n-butylaniline, each based upon the mols in total, of the foregoing four compounds. The resulting nematic liquid crystal composition changes to a smectic liquid crystal at −15° C., and even when allowed to stand at −15° C. for a long time, it does not crystallize. By heating, it becomes an isotropic liquid at 70° C. Its response threshold voltage and response saturation voltage are 1.2 V and 2.0 V at 25° C., respectively, while 1.9 V and 2.6 V at −5° C., respectively. Its rise response time (τ rise) and decay response time (τ decay) are 80 ms and 90 ms at 25° C., respectively, while 600 ms and 650 ms at 0° C., respectively (11 micron cell used; 3 V rms impression).

What is claimed is:

1. A liquid crystal composition obtained by mixing a mixture of two or more kinds of p-alkoxybenzylidene-p'-cyanoanilines expressed by the general formula

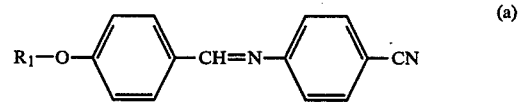

(a)

(wherein R₁ is n-butyl, n-pentyl, n-hexyl or n-octyl group), with one kind alone or two or more kinds in admixture, of p-alkyl-p'-cyanobiphenyls expressed by the general formula

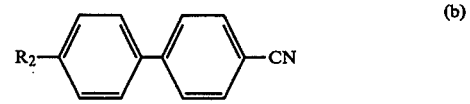

(b)

(wherein R₂ is n-pentyl, n-hexyl or n-heptyl group), in a ratio by mol fraction of the mixture of the compounds expressed by the general formula (a) to one kind or the mixture of the compounds expressed by the general formula (b), of 1:0.66–1:9, and further adding to the resulting liquid crystal composition (A), p-methoxybenzylidene-p'-n-butylaniline, p-ethoxybenzylidene-p'-n-butylaniline, p-methylbenzylidene-p'-n-butylaniline or a mixture thereof, in an amount of 15 mol% or less based on the liquid crystal composition (A).

* * * * *